US011153826B2

(12) United States Patent
Nagaraja et al.

(10) Patent No.: US 11,153,826 B2
(45) Date of Patent: Oct. 19, 2021

(54) PROCEDURE-BASED UPLINK POWER CONTROL

(71) Applicant: QUALCOMM Incorporated, San Diego, CA (US)

(72) Inventors: Sumeeth Nagaraja, San Diego, CA (US); Andrei Dragos Radulescu, San Diego, CA (US); Tao Luo, San Diego, CA (US); Sony Akkarakaran, Poway, CA (US); Makesh Pravin John Wilson, San Diego, CA (US); Xiao Feng Wang, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/033,023

(22) Filed: Jul. 11, 2018

(65) Prior Publication Data

US 2019/0053166 A1    Feb. 14, 2019

Related U.S. Application Data

(60) Provisional application No. 62/543,845, filed on Aug. 10, 2017.

(51) Int. Cl.
*H04W 52/14* (2009.01)
*H04W 52/32* (2009.01)
(Continued)

(52) U.S. Cl.
CPC ......... *H04W 52/146* (2013.01); *H04W 52/32* (2013.01); *H04W 72/0413* (2013.01);
(Continued)

(58) Field of Classification Search
CPC .............. H04W 76/27; H04W 52/146; H04W 72/0413; H04W 74/0833; H04W 52/32;
(Continued)

(56) References Cited

U.S. PATENT DOCUMENTS

2013/0279433 A1\* 10/2013 Dinan ..................... H04J 11/00
                                                        370/329
2016/0183195 A1\* 6/2016 Gao ..................... H04W 52/325
                                                        455/522
(Continued)

OTHER PUBLICATIONS

3rd Generation Partnership Project; Technical Specification Group Radio Access Network; Evolved Universal Terrestrial Radio Access (E-UTRA); Physical layer procedures (Release 14) Jun. 23, 2017 (Year: 2017).\*

(Continued)

*Primary Examiner* — Mehmood B. Khan
(74) *Attorney, Agent, or Firm* — Holland & Hart LLP

(57) ABSTRACT

Methods, systems, and devices for wireless communication are described. A base station may transmit procedure-specific uplink power parameters to one or more user equipments (UEs) in a cell. A UE may determine a procedure including one or more uplink transmissions. The UE may determine a transmit power level corresponding to the procedure based at least in part on the procedure-specific uplink power parameters. The UE may transmit the one or more uplink transmissions using the determined transmit power level.

30 Claims, 12 Drawing Sheets

(51) Int. Cl.
*H04W 76/27* (2018.01)
*H04W 72/04* (2009.01)
*H04W 74/08* (2009.01)
*H04W 52/36* (2009.01)
*H04W 52/48* (2009.01)
*H04W 4/70* (2018.01)

(52) U.S. Cl.
CPC ... *H04W 72/0473* (2013.01); *H04W 74/0833* (2013.01); *H04W 76/27* (2018.02); *H04W 4/70* (2018.02); *H04W 52/362* (2013.01); *H04W 52/48* (2013.01)

(58) Field of Classification Search
CPC ... H04W 72/0473; H04W 4/70; H04W 52/48; H04W 52/362
See application file for complete search history.

(56) References Cited

U.S. PATENT DOCUMENTS

| | | | | |
|---|---|---|---|---|
| 2017/0238305 | A1* | 8/2017 | Chen | H04W 52/06 370/311 |
| 2017/0302337 | A1* | 10/2017 | Liu | H04B 7/005 |
| 2018/0014254 | A1* | 1/2018 | Hwang | H04W 52/24 |
| 2018/0049073 | A1* | 2/2018 | Dinan | H04W 4/70 |
| 2018/0332541 | A1* | 11/2018 | Liu | H04W 72/042 |
| 2019/0174423 | A1* | 6/2019 | Zhang | H04W 52/241 |
| 2019/0190747 | A1* | 6/2019 | Park | H04L 25/0226 |
| 2019/0297583 | A1* | 9/2019 | Lin | H04W 52/10 |
| 2019/0313348 | A1* | 10/2019 | MolavianJazi | H04W 52/146 |
| 2019/0349864 | A1* | 11/2019 | Zhang | H04W 52/325 |
| 2019/0373559 | A1* | 12/2019 | Davydov | H04W 52/58 |
| 2020/0163026 | A1* | 5/2020 | Zhao | H04W 52/243 |

OTHER PUBLICATIONS

3rd Generation Partnership Project; Technical Specification Group Radio Access Network; Evolved Universal Terrestrial Radio Access (E-UTRA); Physical Layer Procedures (Release 14), 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V14.3.0, Jun. 23, 2017, pp. 306-390, XP051299005, [retrieved on Jun. 23, 2017].

3rd Generation Partnership Project; Technical Specification Group Radio Access Network; Evolved Universal Terrestrial Radio Access (E-UTRA); Physical Layer Procedures (Release 14), 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V14.3.0, Jun. 23, 2017, pp. 50-305, XP051299004, [retrieved on Jun. 23, 2017].

3rd Generation Partnership Project; Technical Specification Group Radio Access Network; Evolved Universal Terrestrial Radio Access (E-UTRA); Physical Layer Procedures (Release 14), 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V14.3.0, Jun. 23, 2017, pp. 8-49, XP051299003, 42 pages, [retrieved on Jun. 23, 2017].

International Search Report and Written Opinion—PCT/US2018/041849—ISA/EPO—dated Sep. 28, 2018.

3GPP: LTE, Evolved Universal Terrestrial Radio Access (EUTRA), Physical Layer Procedures, (3GPP TS 36.213 version 14.2.0 Release 14), ETSI TS 136 213, V14.2.0 (Apr. 2017), 456 Pages, Sections 7.1.7 and 8.6, Section.5.1, 6.1, 7.1 and 7.3.2.

Taiwan Search Report—TW107124254—TIPO—dated Aug. 11, 2021.

* cited by examiner

PROCEDURE-BASED UPLINK POWER CONTROL

CROSS REFERENCES

The present Application for Patent claims the benefit of U.S. Provisional Patent Application No. 62/543,845 by NAGARAJA, et al., entitled "PROCEDURE-BASED UPLINK POWER CONTROL," filed Aug. 10, 2017, assigned to the assignee hereof, and expressly incorporated herein by reference in its entirety.

BACKGROUND

The following relates generally to wireless communication, and more specifically to procedure-based uplink power control.

Wireless communications systems are widely deployed to provide various types of communication content such as voice, video, packet data, messaging, broadcast, and so on. These systems may be capable of supporting communication with multiple users by sharing the available system resources (e.g., time, frequency, or power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

When a UE has information to transmit to the base station in an uplink transmission, the UE may calculate an appropriate power level for the uplink transmission. The UE may calculate the appropriate power level based at least in part on a signal-to-interference-and-noise ratio (SINR) and the expected interference with other UEs in the system. This process may be referred to as uplink power control (ULPC).

SUMMARY

The described techniques relate to improved methods, systems, devices, or apparatuses that support procedure-based uplink power control.

A method of wireless communication is described. The method may include receiving, at a user equipment (UE), power configuration information indicating a plurality of procedure-specific uplink power parameters, selecting a procedure-specific uplink power parameter from the plurality of procedure-specific uplink parameters for an uplink transmission based at least in part on an uplink procedure associated with the uplink transmission, determining a transmit power level for the uplink transmission based at least in part on the selected procedure-specific uplink power parameter, and performing the uplink transmission in accordance with the uplink procedure at the determined transmit power level.

An apparatus for wireless communication is described. The apparatus may include means for receiving, at a user equipment (UE), power configuration information indicating a plurality of procedure-specific uplink power parameters, means for selecting a procedure-specific uplink power parameter from the plurality of procedure-specific uplink parameters for an uplink transmission based at least in part on an uplink procedure associated with the uplink transmission, means for determining a transmit power level for the uplink transmission based at least in part on the selected procedure-specific uplink power parameter, and means for performing the uplink transmission in accordance with the uplink procedure at the determined transmit power level.

Another apparatus for wireless communication is described. The apparatus may include a processor, memory in electronic communication with the processor, and instructions stored in the memory. The instructions may be operable to cause the processor to receive, at a user equipment (UE), power configuration information indicating a plurality of procedure-specific uplink power parameters, select a procedure-specific uplink power parameter from the plurality of procedure-specific uplink parameters for an uplink transmission based at least in part on an uplink procedure associated with the uplink transmission, determine a transmit power level for the uplink transmission based at least in part on the selected procedure-specific uplink power parameter, and perform the uplink transmission in accordance with the uplink procedure at the determined transmit power level.

A non-transitory computer readable medium for wireless communication is described. The non-transitory computer-readable medium may include instructions operable to cause a processor to receive, at a user equipment (UE), power configuration information indicating a plurality of procedure-specific uplink power parameters, select a procedure-specific uplink power parameter from the plurality of procedure-specific uplink parameters for an uplink transmission based at least in part on an uplink procedure associated with the uplink transmission, determine a transmit power level for the uplink transmission based at least in part on the selected procedure-specific uplink power parameter, and perform the uplink transmission in accordance with the uplink procedure at the determined transmit power level.

In some examples of the method, apparatus, and non-transitory computer-readable medium described above, receiving the power configuration information may include receiving a radio resource control (RRC) message including the power configuration information.

In some examples of the method, apparatus, and non-transitory computer-readable medium described above, receiving the power configuration information may include receiving one or more of a master information block including the power configuration information, a system information block including the power configuration information, or a combination thereof.

In some examples of the method, apparatus, and non-transitory computer-readable medium described above, the plurality of procedure-specific uplink parameters may include a base power level.

In some examples of the method, apparatus, and non-transitory computer-readable medium described above, the plurality of procedure-specific uplink power parameters may include an offset from a base power level for each of the one or more transmit procedures.

In some examples of the method, apparatus, and non-transitory computer-readable medium described above, the plurality of procedure-specific uplink power parameters may include procedure-specific power levels for each of the one or more transmit procedures.

In some examples of the method, apparatus, and non-transitory computer-readable medium described above, the selected procedure-specific uplink power parameter may include at least one of a base station received power per resource block, a closed loop parameter using feedback from a base station, or a combination thereof.

In some examples of the method, apparatus, and non-transitory computer-readable medium described above, the selected procedure-specific uplink power parameter may include at least one of an initial target power, a power offset for a preamble format, or a power increase rate if no random access response may be received.

In some examples of the method, apparatus, and non-transitory computer-readable medium described above, the selected procedure-specific uplink power parameter may include at least one of an initial target power, a power offset for a preamble format, or a power increase rate if one or more retransmissions are to be made.

In some examples of the method, apparatus, and non-transitory computer-readable medium described above, the selected procedure-specific uplink power parameter may include a cell-specific component and a UE-specific component.

In some examples of the method, apparatus, and non-transitory computer-readable medium described above, the uplink procedure may include at least one of a beam failure recovery procedure, a scheduling request procedure, a channel state information-reference signal (CSI-RS) reporting procedure, an acknowledgement/negative acknowledgement (ACK/NACK) procedure, a handover procedure, a sounding reference signal (SRS) procedure, an ultra-reliable and low-latency communication (URLLC) procedure, or a combination thereof.

A method of wireless communication is described. The method may include generating, at a base station, power configuration information indicating a plurality of procedure-specific power uplink power parameters, transmitting the power configuration information to a user equipment (UE), and receiving an uplink transmission at a power level based at least in part on the power configuration information.

An apparatus for wireless communication is described. The apparatus may include means for generating, at a base station, power configuration information indicating a plurality of procedure-specific power uplink power parameters, means for transmitting the power configuration information to a user equipment (UE), and means for receiving an uplink transmission at a power level based at least in part on the power configuration information.

Another apparatus for wireless communication is described. The apparatus may include a processor, memory in electronic communication with the processor, and instructions stored in the memory. The instructions may be operable to cause the processor to generate, at a base station, power configuration information indicating a plurality of procedure-specific power uplink power parameters, transmit the power configuration information to a user equipment (UE), and receive an uplink transmission at a power level based at least in part on the power configuration information.

A non-transitory computer readable medium for wireless communication is described. The non-transitory computer-readable medium may include instructions operable to cause a processor to generate, at a base station, power configuration information indicating a plurality of procedure-specific power uplink power parameters, transmit the power configuration information to a user equipment (UE), and receive an uplink transmission at a power level based at least in part on the power configuration information.

In some examples of the method, apparatus, and non-transitory computer-readable medium described above, transmitting the power configuration information may include transmitting radio resource control (RRC) signaling including the power configuration information.

In some examples of the method, apparatus, and non-transitory computer-readable medium described above, transmitting the power configuration information may include transmitting a master information block including the plurality of procedure-specific uplink power parameters, a system information block including the plurality of procedure-specific uplink power parameters, or a combination thereof.

In some examples of the method, apparatus, and non-transitory computer-readable medium described above, generating the power configuration information may include generating a base power level for the UE.

In some examples of the method, apparatus, and non-transitory computer-readable medium described above, generating the power configuration may include generating an offset for each uplink procedure associated with one of the procedure-specific uplink power parameters.

In some examples of the method, apparatus, and non-transitory computer-readable medium described above, generating the power configuration information may include generating procedure-specific uplink power parameters for each of the one or more uplink procedures.

In some examples of the method, apparatus, and non-transitory computer-readable medium described above, at least one of the plurality of procedure-specific uplink power parameters may include a cell-specific component and a UE-specific component.

In some examples of the method, apparatus, and non-transitory computer-readable medium described above, one of the plurality of procedure-specific uplink power parameters corresponds to at least one of a beam failure recovery procedure, a scheduling request procedure, a channel state information-reference signal (CSI-RS) reporting procedure, an acknowledgement/negative acknowledgement (ACK/NACK) procedure, a handover procedure, an ultra-reliable and low-latency communication (URLLC) procedure, or a combination thereof.

DETAILED DESCRIPTION

A user equipment (UE) may use uplink power control (ULPC) techniques to determine an appropriate power level for uplink transmissions. However, channel conditions may change when a channel degrades (affecting a target signal-to-interference-and-noise ratio (SINR) or when UEs join or leave the system (affecting an acceptable interference). Multi-beam operation may introduce additional challenges, because a UE rotation or movement or signal blockage may result in a degradation or failure in beam quality.

To address these issues, a UE may determine a transmit power level for an uplink transmission based on a procedure. As such, the UE may achieve robustness in uplink transmission required for successful operation of each specific procedure. For example, a beam failure recovery procedure may be performed after beam quality has degraded. In such a scenario, the UE may transmit at a higher level than previous data transmissions in order to compensate for the degradation.

Accordingly, the UE may determine a transmit power level for an uplink transmission based at least in part on one or more procedure-specific uplink power parameters. The procedure-specific uplink power parameters may correspond to, for example, beam failure recovery procedures, scheduling request procedures, channel state information—reference signal reporting procedures, acknowledgement/negative acknowledgement reporting procedures, handover procedures, or combinations thereof. The procedure-specific uplink power parameters may be configured by the network, e.g., by being communicated from a base station to the UEs in radio resource control signaling or broadcast messages.

Aspects of the disclosure are initially described in the context of a wireless communications system. Aspects of the disclosure are further illustrated by and described with reference to apparatus diagrams, system diagrams, and flowcharts that relate to procedure-based uplink power control.

Figure 1:
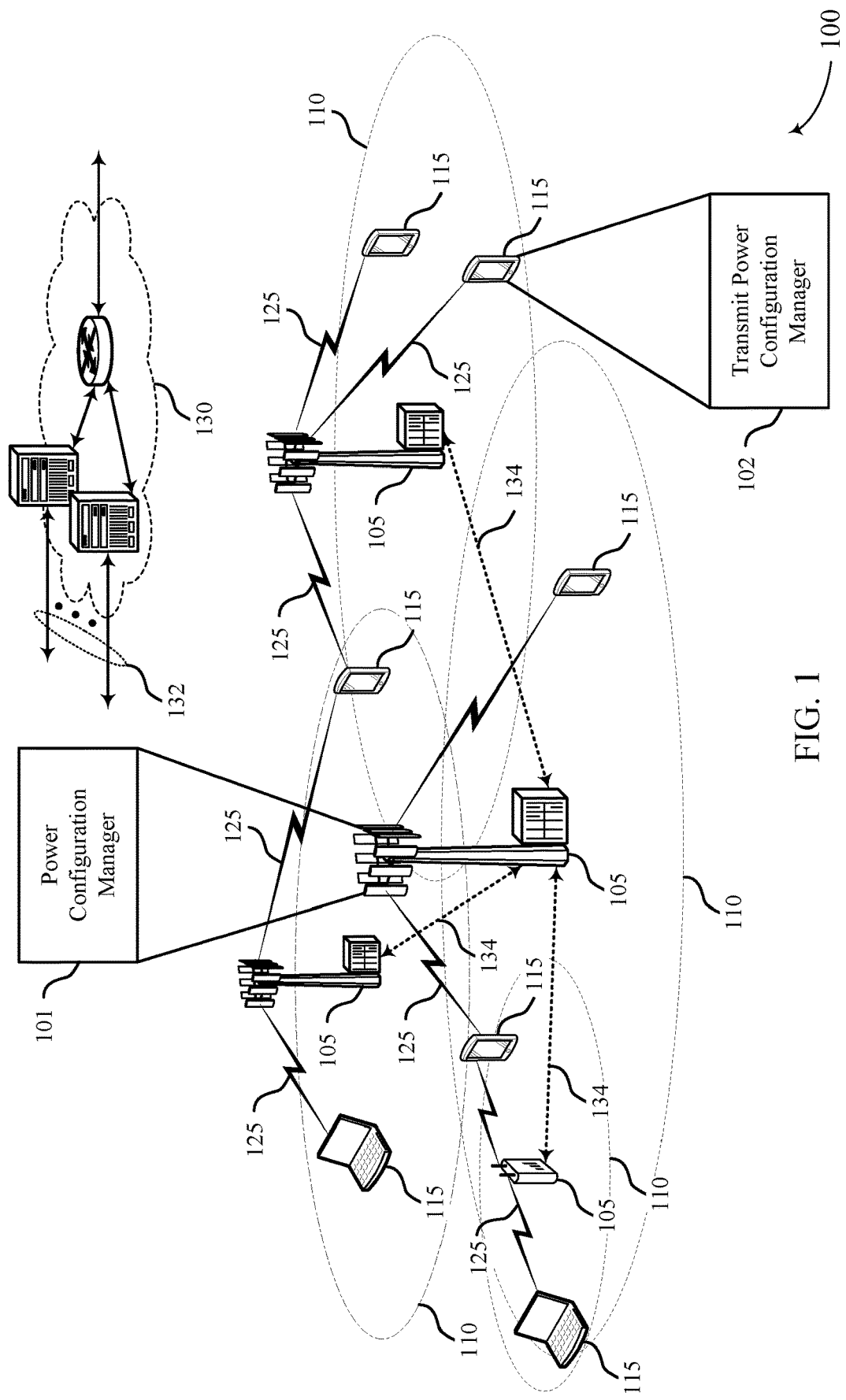
FIG. 1 illustrates an example of a system for wireless communication that supports procedure-based uplink power control in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use a hybrid automatic repeat request (HARQ) to provide retransmission at the MAC layer to improve link efficiency. In the control plane, a Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems 100, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems 100 may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., a set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems 100 such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a power configuration manager 101, which may generate power configuration information for the UEs 115. The power configuration manager 101 may generate a plurality of procedure-specific uplink power parameters for the UEs 115.

For example, the power configuration manager 101 may generate procedure-specific uplink power parameters for beam failure recovery procedures, scheduling request procedures, channel state information—reference signal reporting procedures, acknowledgement/negative acknowledgement procedures, handover procedures, sounding reference signal procedures, or a combination thereof.

The power configuration manager 101 may generate a value for each procedure-specific uplink power parameter. In some examples, the power configuration manager 101 may generate an offset relative to a base value for each procedure-specific uplink power parameter. In some examples, the power configuration manager 101 may generate a cell-specific component for all UEs 115 and a UE-specific component for each individual UE 115.

The power configuration manager 101 may transmit power configuration information, including an indication of the plurality of procedure-specific uplink power parameters, in a radio resource control (RRC) signaling. In some examples, the power configuration information may be transmitted in a message information block or in a system information block.

UEs 115 may include a transmit power configuration manager 102, which may process power configuration information received from the base stations 105 and calculate a transmit power level based at least in part on the power configuration information. The transmit power configuration manager 102 may receive an indication of an uplink procedure (e.g., a beam failure recovery procedure for a PUCCH transmission). The transmit power configuration manager 102 may select a procedure-specific uplink power parameter based at least in part on the indicated procedure. For example, the transmit power configuration manager 102 may select the procedure-specific uplink power parameter from the power configuration information corresponding to the indicated procedure (e.g., the beam failure recovery procedure for the PUCCH transmission). The transmit power configuration manager 102 may calculate a transmit power level for the procedure based at least in part on the selected procedure-specific uplink power parameter.

Figure 2:
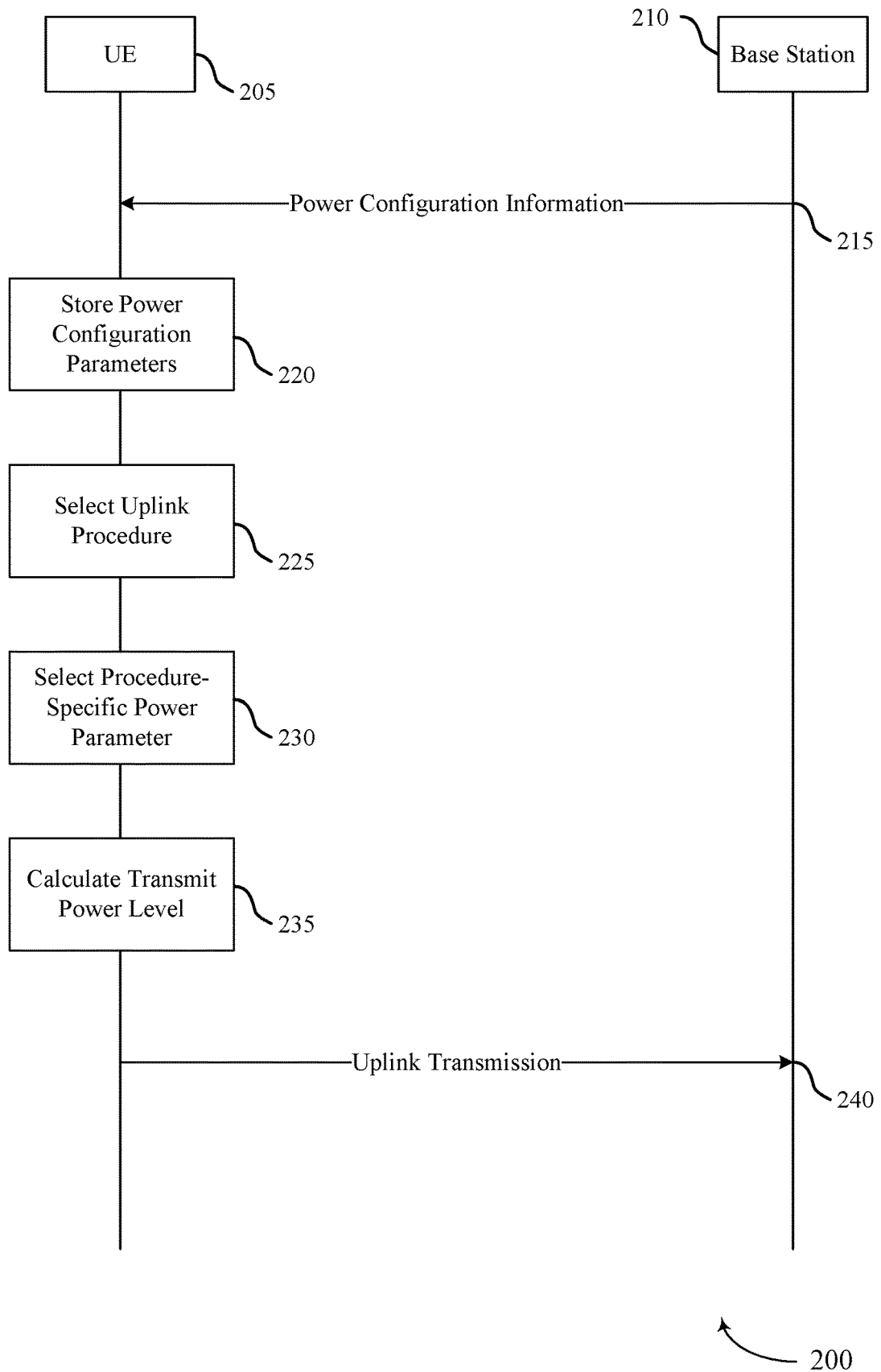
FIG. 2 illustrates an example of a communications flow in a wireless communication system that supports procedure-based uplink power control in accordance with aspects of the present disclosure.

FIG. 2 illustrates an example of a communications flow 200 in a wireless communication system that supports procedure-based uplink power control in accordance with various aspects of the present disclosure. In some examples, the wireless communication system may implement aspects of wireless communications system 100.

The communications flow 200 illustrates communications between a UE 205 and a base station 210. The UE 205 may be an example of aspects of UE 115 as described with reference to FIG. 1. The base station 210 may be an example of aspects of base station 105 as described with reference to FIG. 1.

The base station 210 may transmit power configuration information 215 to UE 205. In some examples, the power configuration information 215 may be transmitted in radio resource control (RRC) signaling. In some examples, the power configuration information 215 may be transmitted in a master information block (MIB) or a system information block (SIB).

The power configuration information may indicate a plurality of procedure-specific uplink power parameters. In some example, the plurality of procedure-specific uplink power parameters may include procedure-specific power parameters for communications over a physical uplink control channel (PUCCH). For example, the procedure-specific uplink power parameters may include base station received power per resource block when assuming 0 decibel path loss over the PUCCH parameters, $P_{0\_PUCCH}$, or closed loop component using feedback from the base station parameters, g(i). In some examples, the plurality of procedure-specific uplink power parameters may include procedure-specific power parameters for communications over a random access channel (RACH) such as a physical RACH (PRACH). For example, the procedure-specific uplink power parameters may include initial target power parameters, $P_{InitialRxTarget}$, power offset for preamble format parameters, $\Delta_{Preamble}$, or power increase rate if no random access response (RAR) is received parameters, RampingStep.

The plurality of procedure-specific power parameters may include a procedure-specific power parameter for PUCCH transmissions including a PUCCH transmission for a beam failure recovery procedure, a PUCCH transmission for a scheduling request procedure, a PUCCH transmission for a channel state information—reference signal (CSI-RS) reporting procedure, or a PUCCH transmission for an acknowledgement/negative acknowledgement (ACK/NACK) reporting procedure. The plurality of procedure-specific power parameters may include a procedure-specific power parameter for RACH transmissions including a RACH transmission for a beam failure recovery procedure, a RACH transmission for a scheduling request procedure, and a RACH transmission for a handover procedure. In some examples, the plurality of procedure-specific uplink power parameters may include a procedure-specific power parameter for a sounding resource signal (SRS) procedure. In some examples, the plurality of procedure-specific uplink power parameters may include procedure-specific power parameters for ultra-reliable and low-latency communications (URLLC).

In some examples, each procedure-specific uplink power parameter may be indicated by listing a separate power level for the procedure. In some other examples, each procedure-specific uplink power parameter may be indicated by listing a base power level for a set of parameters (e.g., for all PUCCH or RACH-related parameters) and an offset for each procedure. In some examples, each power-specific uplink power parameter may be indicated by providing a reference to power levels stored at the plurality of UEs including UE 205.

In some examples, the power configuration information 215 may include a cell-specific portion and a plurality of UE-specific portions. The cell-specific portion may indicate procedure-specific uplink power parameters for all UEs in the cell. For example, the cell-specific portion may indicate, for example, an average value, a minimum value, or a most common value for the procedure-specific uplink power parameters. The UE-specific portions may indicate procedure-specific uplink power parameters for one or more of the UEs in the cell. The UE-specific portion may indicate procedure-specific uplink power parameters for a particular UE in the cell. In some examples, the UE-specific portion may indicate an offset from the values in the cell-specific portion (e.g., offsets from the average or minimum values). In some other examples, the UE-specific portions may indicate values for the UEs (e.g., to differentiate from the most common values listed in the cell-specific portion). In some examples, the UE-specific portions may only include power configuration information for a subset of the UEs in a cell (e.g., because the remaining UEs in the cell may use the parameters indicated in the cell-specific portion). Each UE-specific portion may include an indication of the one or more UEs to which it is applicable.

The UE 205 may store one or more power configuration parameters at 220. For example, the UE 205 may store the procedure-specific uplink power parameters indicated in the power configuration information 215. In some examples, the UE 205 may generate and store procedure-specific uplink power parameters based at least in part on the power configuration information 215. For example, the UE 205 may generate and store a procedure-specific uplink power parameter based on a base value for the procedure-specific uplink power parameter and an offset for the procedure-specific uplink power parameter. As another example, the UE 205 may generate and store a procedure-specific uplink power parameter based on a cell-specific value for the procedure-specific uplink power parameter and a UE-specific value for the procedure-specific uplink power parameter. In some other examples, the UE 205 may store an indication of the pre-stored parameters that may be used for communications.

The UE 205 may then select a procedure at 225. In some examples, the procedure may be a beam failure recovery procedure for a PUCCH transmission, a scheduling request procedure for a PUCCH transmission, a CSI-RS reporting procedure for a PUCCH transmission, an ACK/NACK reporting procedure for a PUCCH transmission, or a combination thereof. In some examples, the procedure may be a beam failure recovery request for a RACH transmission, a scheduling request procedure for a RACH transmission, a handover procedure for a RACH transmission, or a combination thereof. In some examples, the procedure may be an SRS procedure. In some examples, the procedure may be a procedure for URLLC transmissions.

The UE 205 may select a procedure-specific power parameter at 230. The procedure-specific power parameter may be selected from the stored power configuration parameters. The procedure-specific power parameter may be selected based at least in part on a calculation used to determine a transmit power level. For example, for PUCCH transmissions, the UE 205 may calculate a transmit power level $P_{PUCCH}(i)$ as:

$$P_{PUCCH}(i) = \min\{P_{CMAX}, P_{0\_PUCCH} + PL + h(n_{CQI}, n_{HARQ}, n_{SR}) + \Delta_{F_{PUCCH}}(F) + g(i)\} \quad (1)$$

where $P_{CMAX}$ indicates the configured UE maximum transmission power, $P_{0\_PUCCH}$ indicates the base station received power per resource block when assuming 0 decibel pathloss (PL), PL indicates the downlink pathloss estimate calculated in the UE 205, $A_{F\_PUCCH}(F)$ indicates the power offset for PUCCH format, where F is a PUCCH format, $h(n_{CQI}, n_{HARQ}, n_{SR})$ is a function of a number of uplink control information bits and PUCCH format, and g(i) indicates a closed loop component using feedback from the base station 210. In some examples, the $P_{0\_PUCCH}$ parameter may vary depending on the procedure. In some examples, the base station 210 may transmit the $P_{0\_PUCCH}$ parameter using a combination of a cell-specific component (e.g., within an SIB, a reconfiguration message, or the like) and a UE-specific component (e.g., via an RRC signaling including an RRC connection set-up message, an RRC connection reconfiguration message, an RRC connection re-establishment message, or the like). In single-beam or multi-beam operation, $P_{0\_PUCCH}$ parameter may be procedure-specific or content-specific. For example, for a procedure j (where j is an integer), the $P_{0\_PUCCH}$ parameter may be represented as $P_{0\_PUCCH}(j)$, where $P_{0\_PUCCH}(0)$ may correspond to a $P_{0\_PUCCH}$ parameter for a beam failure recovery procedure, $P_{0\_PUCCH}(1)$ may correspond to a $P_{0\_PUCCH}$ parameter for a scheduling request procedure, $P_{0\_PUCCH}(2)$ may correspond to a $P_{0\_PUCCH}$ parameter for a CSI-RS reporting procedure, $P_{0\_PUCCH}(3)$ may correspond to a $P_{0\_PUCCH}$ parameter for an ACK/NACK reporting procedure, $P_{0\_PUCCH}(4)$ may correspond to a $P_{0\_PUCCH}$ parameter for a grantless URLLC procedure, and $P_{0\_PUCCH}(5)$ may correspond to a $P_{0\_PUCCH}$ parameter for a SRS (uplink beam management) procedure. In some examples, the g(i) parameter may vary depending on the procedure, and may be represented as g(i, j). In this example, a value of j increases as the power required for specific procedures decreases. As such, since the beam recovery mechanism over uplink channels may require additional robustness, the value of j is indicated as 0. Values for j are not limited to 0-5 as shown in the above example, and more or less number of values may be defined corresponding to different combinations of PUCCH content. In some example, PUCCH may be a short PUCCH format or long PUCCH format.

As another example, the UE 205 may calculate a transmit power for physical RACH transmissions, PRACH(i), as:

$$P_{PRACH}(i) = \min\{P_{CMAX}, PL + P_{InitialRxTarget} + \Delta_{Preamble} + (Counter_{Preamble} - 1) \cdot RampingStep\} \quad (2)$$

where $P_{InitialRxTarget}$ indicates the initial target power when assuming 0 dB pathloss and a reference preamble format, $\Delta_{Preamble}$ indicates a power offset for preamble format, $Counter_{Preamble}$ indicates an increase by 1 if no RAR is received, and RampingStep indicates a power increase rate if no RAR is received. In some examples, the $P_{InitialRxTarget}$ parameter may vary depending on the procedure. For example, for a procedure j (where j is an integer), the $P_{InitialRxTarget}$ parameter may be represented as $P_{InitialRxTarget}(j)$, where $P_{InitialRxTarget}(0)$ may correspond to a $P_{InitialRxTarget}$ parameter for a beam failure recovery request, $P_{InitialRxTarget}(1)$ may correspond to a $P_{InitialRxTarget}$ parameter for a scheduling request procedure, $P_{InitialRxTarget}(2)$ may correspond to a $P_{InitialRxTarget}$ parameter for handover procedure, and $P_{InitialRxTarget}(3)$ may correspond to a $P_{InitialRxTarget}$ parameter for contention-based URLLC procedure. In some examples, the $\Delta_{Preamble}$ parameter may vary depending on the procedure, and may be represented as $\Delta_{Preamble}(h)$. In some examples, the RampingStep procedure may vary depending on the procedure, and may be represented as $\Delta_{Preamble}(j)$.

The UE 235 may determine a transmit power level for one or more uplink transmissions involved in the procedure at 235. The UE 235 may determine the transmit power level based at least in part on the selected procedure-specific power parameter. For example, the UE 235 may determine a transmit power level based at least in part on Equation (1) for a PUCCH transmission or Equation (2) for a RACH transmission.

The UE 205 may transmit one or more uplink transmissions 240 involved in the procedure to the base station 210.

Figure 3:
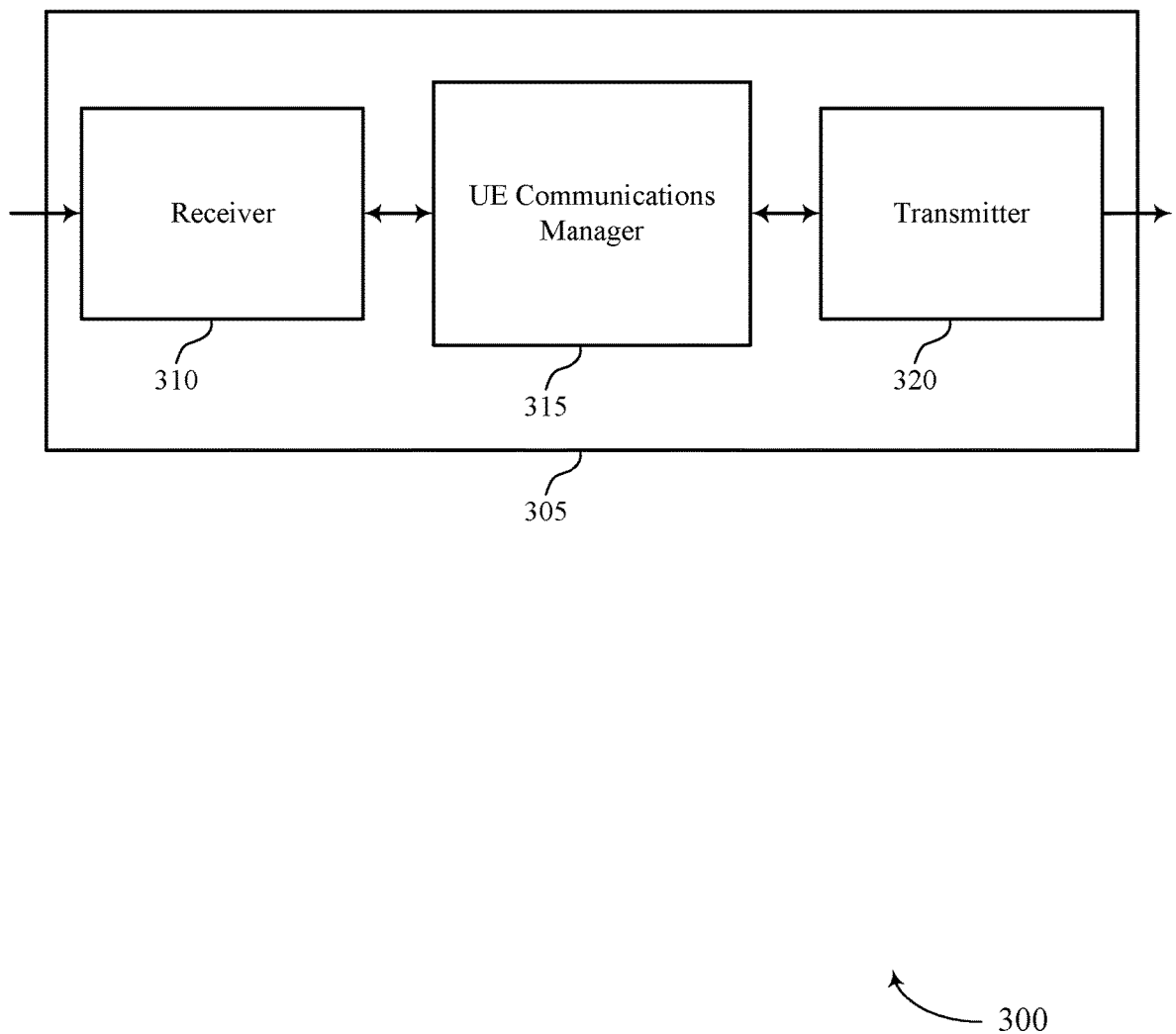
FIGS. 3 through 5 show block diagrams of a device that supports procedure-based uplink power control in accordance with aspects of the present disclosure.

FIG. 3 shows a block diagram 300 of a wireless device 305 that supports procedure-based uplink power control in accordance with aspects of the present disclosure. Wireless device 305 may be an example of aspects of a user equipment (UE) 115 as described herein. Wireless device 305 may include receiver 310, UE communications manager 315, and transmitter 320. Wireless device 305 may also include a processor. Each of these components may be in communication with one another (e.g., via one or more buses).

Receiver 310 may receive information such as packets, user data, or control information associated with various information channels (e.g., control channels, data channels, and information related to procedure-based uplink power control, etc.). Information may be passed on to other components of the device. Receiver 310 may be an example of aspects of transceiver 635 described with reference to FIG. 6. Receiver 310 may utilize a single antenna or a set of antennas.

UE communications manager 315 may be an example of aspects of UE communications manager 615 described with reference to FIG. 6.

UE communications manager 315 and/or at least some of its various sub-components may be implemented in hardware, software executed by a processor, firmware, or any combination thereof. If implemented in software executed by a processor, the functions of UE communications manager 315 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. UE communications manager 315 and/or at least some of its various sub-components may be physically located at various positions, including being distributed such that portions of functions are implemented at different physical locations by one or more physical devices. In some examples, UE communications manager 315 and/or at least some of its various sub-components may be a separate and distinct component in accordance with various aspects of the present disclosure. In other examples, UE communications manager 315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 315 may receive, at a UE 115, power configuration information indicating a set of procedure-specific uplink power parameters, select a procedure-specific uplink power parameter from the set of procedure-specific uplink parameters for an uplink transmission based on an uplink procedure associated with the uplink transmission, determine a transmit power level for the uplink transmission based on the selected procedure-specific uplink power parameter, and perform the uplink transmission in accordance with the uplink procedure at the determined transmit power level.

Transmitter 320 may transmit signals generated by other components of the device 305. In some examples, transmitter 320 may be collocated with receiver 310 in a transceiver module. For example, transmitter 320 may be an example of aspects of transceiver 635 described with reference to FIG. 6. Transmitter 320 may utilize a single antenna or a set of antennas.

Figure 4:
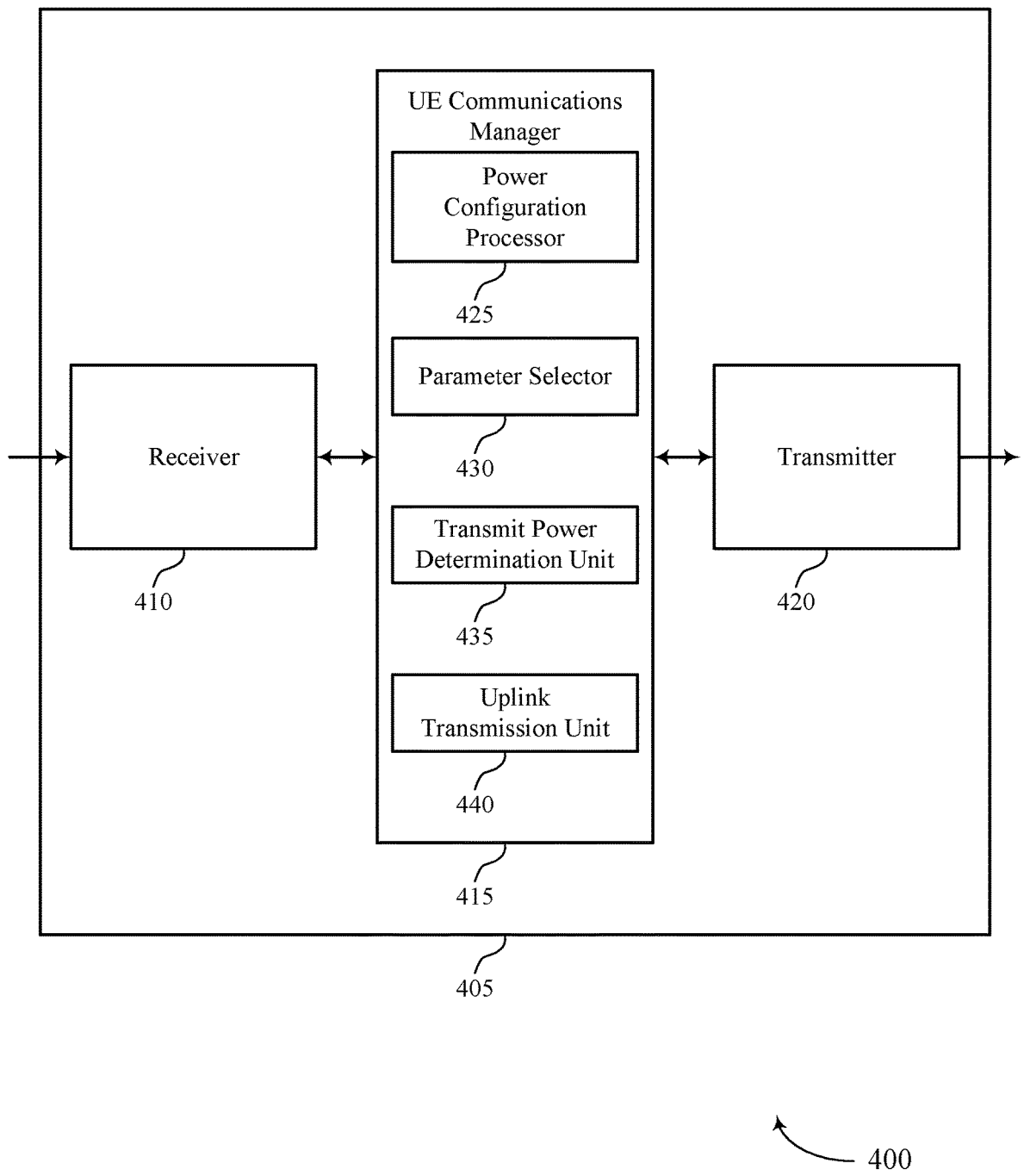

FIG. 4 shows a block diagram 400 of a wireless device 405 that supports procedure-based uplink power control in accordance with aspects of the present disclosure. Wireless device 405 may be an example of aspects of a wireless device 305 or a UE 115 as described with reference to FIG. 3. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to procedure-based uplink power control, etc.). Information may be passed on to other components of the device 405. Receiver 410 may be an example of aspects of transceiver 635 described with reference to FIG. 6. Receiver 410 may utilize a single antenna or a set of antennas.

UE communications manager 415 may be an example of aspects of the UE communications manager 615 described with reference to FIG. 6.

UE communications manager 415 may also include power configuration processor 425, parameter selector 430, transmit power determination unit 435, and uplink transmission unit 440.

Power configuration processor 425 may receive, at a UE 115, power configuration information indicating a set of procedure-specific uplink power parameters. In some cases, receiving the power configuration information includes receiving a radio resource control (RRC) message including the power configuration information. In some cases, receiving the power configuration information includes receiving one or more of: a master information block including the power configuration information, a system information block including the power configuration information, or a combination thereof. In some cases, the set of procedure-specific uplink parameters includes a base power level. In some cases, the set of procedure-specific uplink power parameters includes an offset from a base power level for each of the one or more transmit procedures. In some cases, the set of procedure-specific uplink power parameters includes procedure-specific power levels for each of the one or more transmit procedures. In some cases, the uplink procedure includes one of a beam failure recovery procedure, a scheduling request procedure, a channel state information-reference signal (channel state information (CSI)-RS) reporting procedure, an acknowledgement (ACK)/negative acknowledgement (NACK) procedure, a handover procedure, a sounding reference signal (SRS) procedure, an ultra-reliable and low-latency communication (URLLC) procedure, or a combination thereof.

Parameter selector 430 may select a procedure-specific uplink power parameter from the set of procedure-specific uplink parameters for an uplink transmission based on an uplink procedure associated with the uplink transmission. In some cases, the selected procedure-specific uplink power parameter includes one of a base station received power per resource block, a closed loop parameter using feedback from a base station, or a combination thereof. In some cases, the selected procedure-specific uplink power parameter includes one of an initial target power, a power offset for a preamble format, and a power increase rate if no random access response is received. In some cases, the selected procedure-specific uplink power parameter includes a cell-specific component and a UE-specific component.

Transmit power determination unit 435 may determine a transmit power level for the uplink transmission based on the selected procedure-specific uplink power parameter.

Uplink transmission unit 440 may perform the uplink transmission in accordance with the uplink procedure at the determined transmit power level.

Transmitter 420 may transmit signals generated by other components of the device. In some examples, transmitter 420 may be collocated with receiver 410 in a transceiver module. For example, transmitter 420 may be an example of aspects of transceiver 635 described with reference to FIG. 6. Transmitter 420 may utilize a single antenna or a set of antennas.

Figure 5:
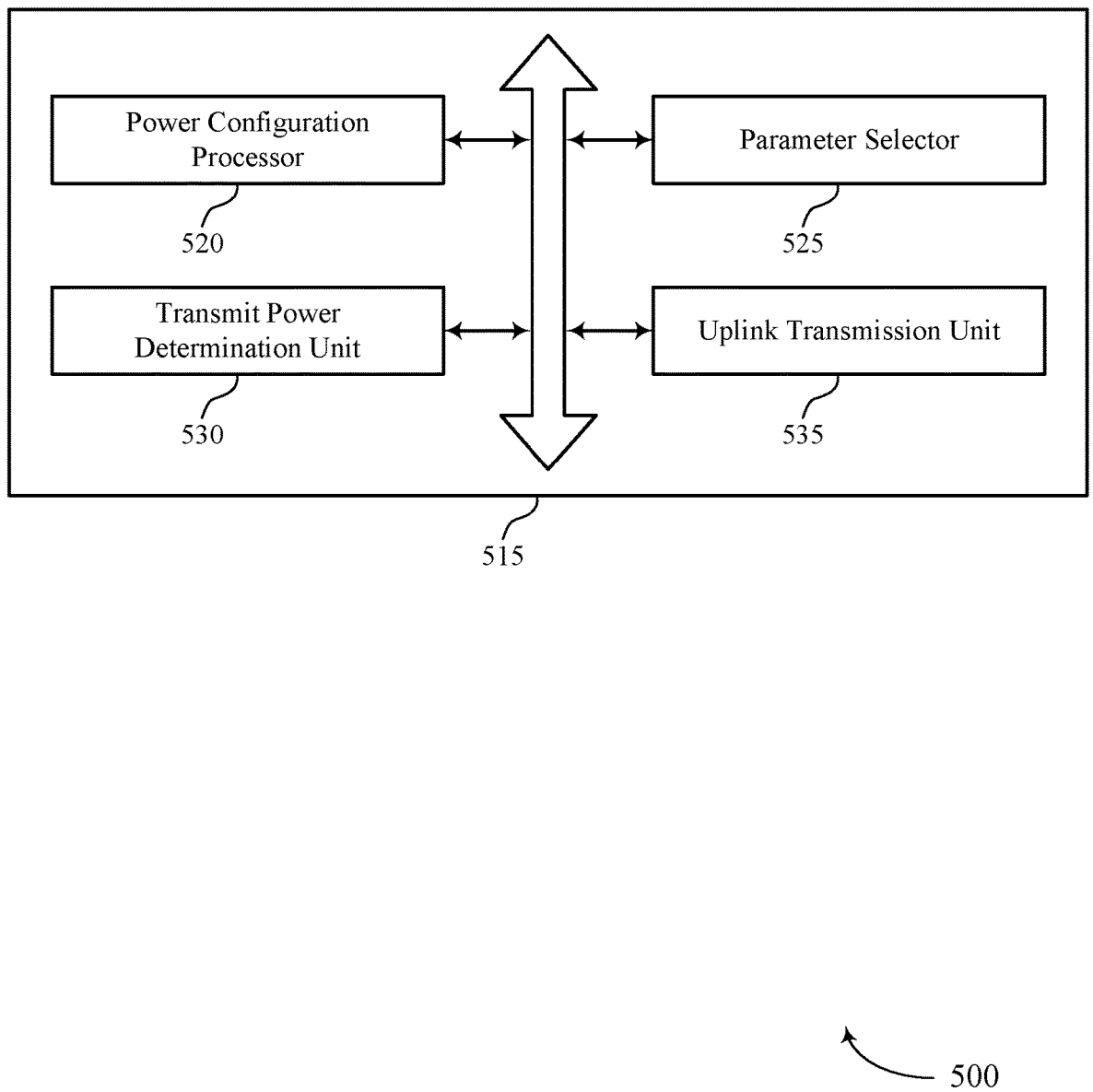

FIG. 5 shows a block diagram 500 of UE communications manager 515 that supports procedure-based uplink power control in accordance with aspects of the present disclosure. UE communications manager 515 may be an example of aspects of UE communications manager 315, 415, or 615 described with reference to FIGS. 3, 4, and 6. UE communications manager 515 may include power configuration processor 520, parameter selector 525, transmit power determination unit 530, and uplink transmission unit 535. Each of these modules may communicate, directly or indirectly, with one another (e.g., via one or more buses).

Power configuration processor 520 may receive, at a UE 115, power configuration information indicating a set of procedure-specific uplink power parameters. In some cases, receiving the power configuration information includes: receiving an RRC message including the power configuration information. In some cases, receiving the power configuration information includes receiving one or more of a master information block including the power configuration information, a system information block including the power configuration information, or a combination thereof. In some cases, the set of procedure-specific uplink parameters includes a base power level. In some cases, the set of procedure-specific uplink power parameters includes an offset from a base power level for each of the one or more transmit procedures. In some cases, the set of procedure-specific uplink power parameters includes procedure-specific power levels for each of the one or more transmit procedures. In some cases, the uplink procedure includes one of a beam failure recovery procedure, a scheduling request procedure, a channel state information-reference signal (CSI-RS) reporting procedure, an acknowledgement/negative acknowledgement (ACK/NACK) procedure, a handover procedure, an SRS procedure, an ultra-reliable and low-latency communication (URLLC) procedure, or a combination thereof.

Parameter selector 525 may select a procedure-specific uplink power parameter from the set of procedure-specific uplink parameters for an uplink transmission based on an uplink procedure associated with the uplink transmission. In some cases, the selected procedure-specific uplink power parameter includes one of a base station received power per resource block, a closed loop parameter using feedback from a base station, or a combination thereof. In some cases, the selected procedure-specific uplink power parameter includes one of an initial target power, a power offset for a preamble format, and a power increase rate if no random access response is received. In some cases, the selected procedure-specific uplink power parameter includes a cell-specific component and a UE-specific component.

Transmit power determination unit 530 may determine a transmit power level for the uplink transmission based on the selected procedure-specific uplink power parameter.

Uplink transmission unit 535 may perform the uplink transmission in accordance with the uplink procedure at the determined transmit power level.

Figure 6:
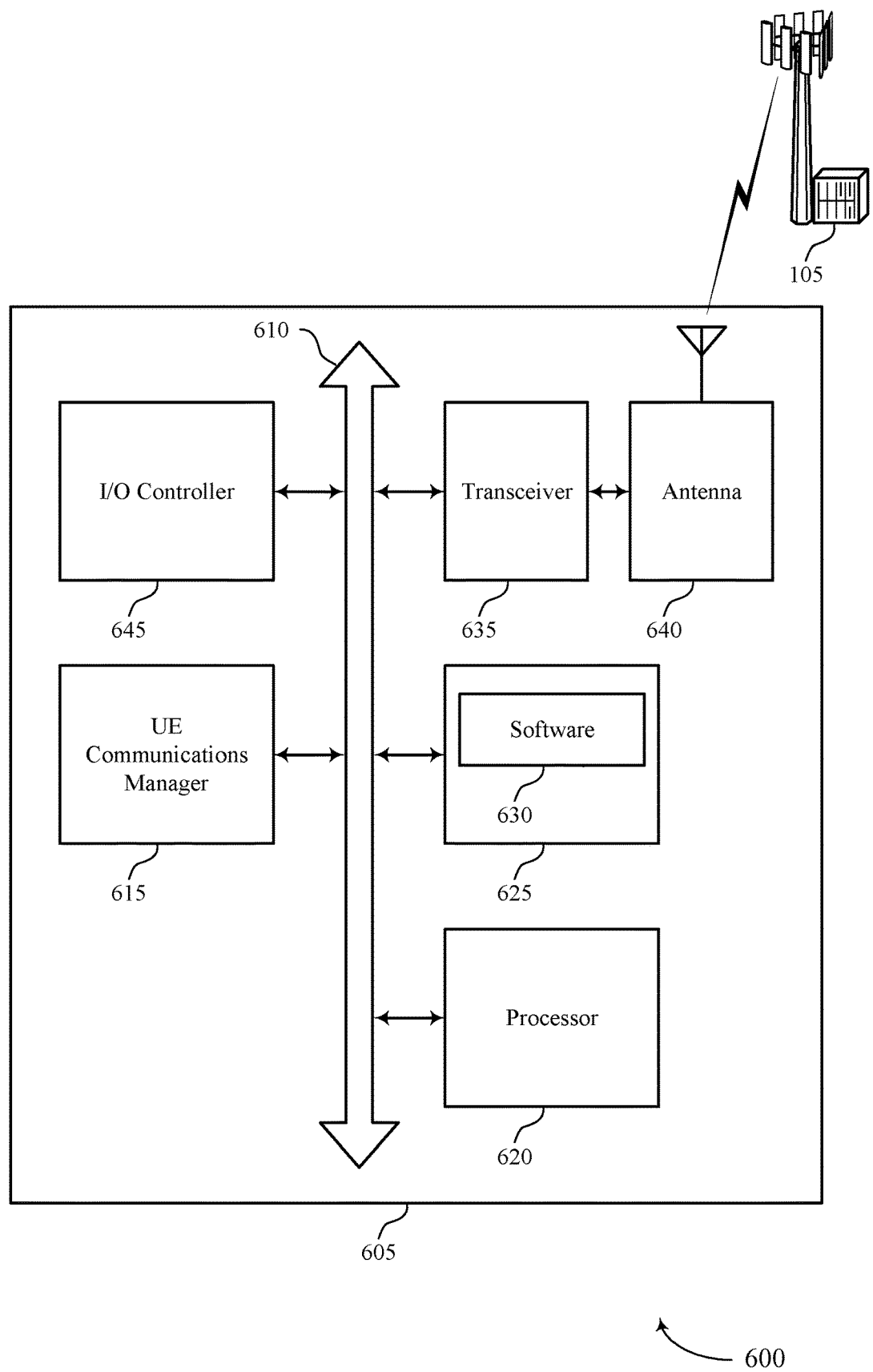
FIG. 6 illustrates a block diagram of a system including a UE that supports procedure-based uplink power control in accordance with aspects of the present disclosure.

FIG. 6 shows a diagram of a system 600 including a device 605 that supports procedure-based uplink power control in accordance with aspects of the present disclosure. Device 605 may be an example of or include the components of wireless device 305, wireless device 405, or a UE 115 as described above, e.g., with reference to FIGS. 3 and 4. Device 605 may include components for bi-directional voice and data communications including components for transmitting and receiving communications, including UE communications manager 615, processor 620, memory 625, software 630, transceiver 635, antenna 640, and I/O controller 645. These components may be in electronic communication via one or more buses (e.g., bus 610). Device 605 may communicate wirelessly with one or more base stations 105.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting procedure-based uplink power control).

Memory 625 may include random access memory (RAM) and read only memory (ROM). Memory 625 may store computer-readable, computer-executable software 630 including instructions that, when executed, cause processor 620 to perform various functions described herein. In some cases, memory 625 may contain, among other things, a basic input/output system (BIOS) which may control basic hardware or software operation such as the interaction with peripheral components or devices.

Software 630 may include code to implement aspects of the present disclosure, including code to support procedure-based uplink power control. Software 630 may be stored in a non-transitory computer-readable medium such as system memory or other memory. In some cases, software 630 may not be directly executable by the processor but may cause a computer (e.g., when compiled and executed) to perform functions described herein.

Transceiver 635 may communicate bi-directionally, via one or more antennas, wired, or wireless links as described above. For example, transceiver 635 may represent a wireless transceiver and may communicate bi-directionally with another wireless transceiver. Transceiver 635 may also include a modem to modulate the packets and provide the modulated packets to the antennas for transmission, and to demodulate packets received from the antennas.

In some cases, the wireless device may include a single antenna 640. However, in some cases the device may have more than one antenna 640, which may be capable of concurrently transmitting or receiving multiple wireless transmissions.

I/O controller 645 may manage input and output signals for device 605. I/O controller 645 may also manage peripherals not integrated into device 605. In some cases, I/O controller 645 may represent a physical connection or port to an external peripheral. In some cases, I/O controller 645 may utilize an operating system such as iOS®, ANDROID®, MS-DOS®, MS-WINDOWS®, OS/2®, UNIX®, LINUX®, or another known operating system. In other cases, I/O controller 645 may represent or interact with a modem, a keyboard, a mouse, a touchscreen, or a similar device. In some cases, I/O controller 645 may be implemented as part of a processor. In some cases, a user may interact with device 605 via I/O controller 645 or via hardware components controlled by I/O controller 645.

Figure 7:
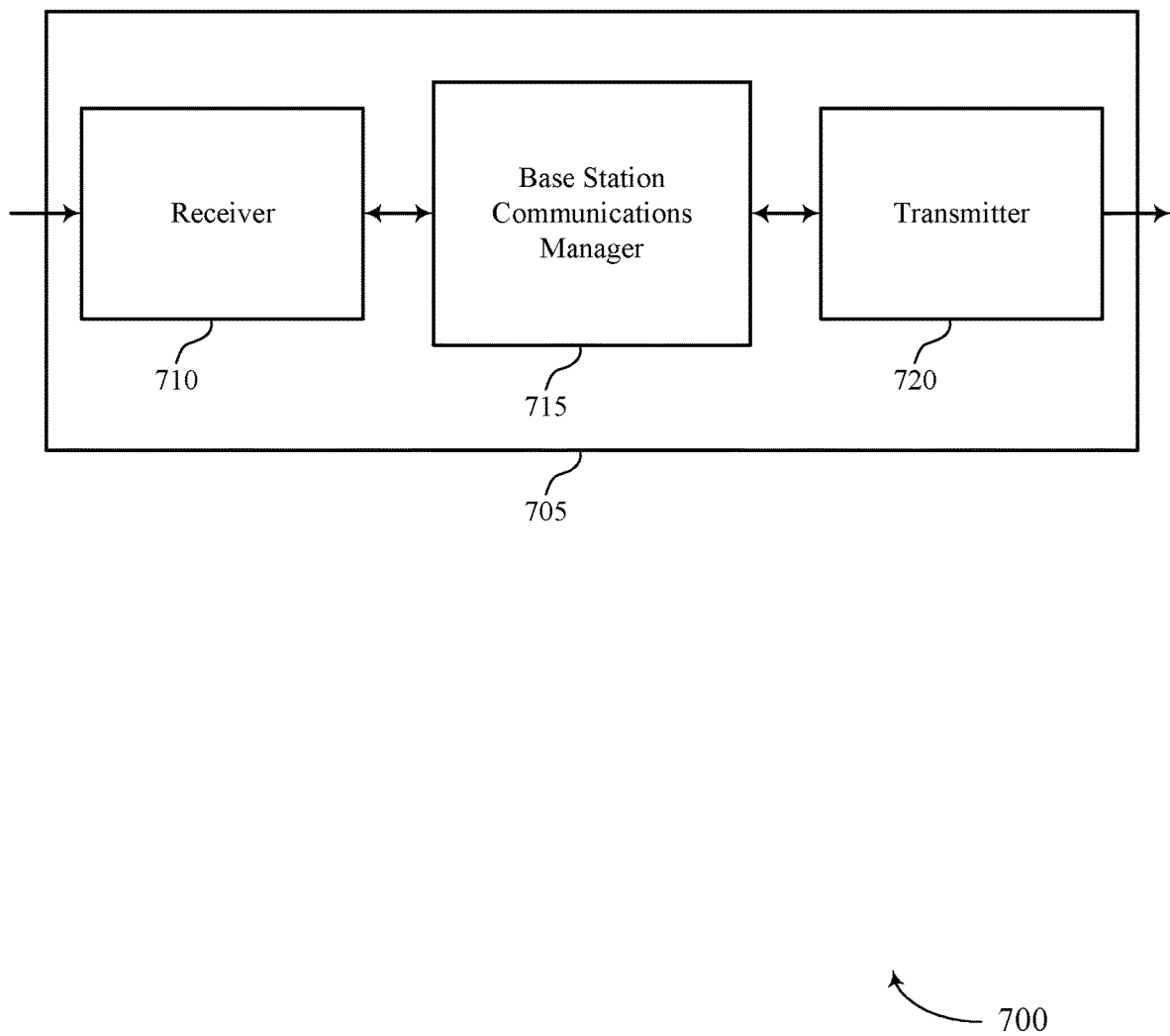
FIGS. 7 through 9 show block diagrams of a device that supports procedure-based uplink power control in accordance with aspects of the present disclosure.

FIG. 7 shows a block diagram 700 of a wireless device 705 that supports procedure-based uplink power control in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to procedure-based uplink power control, etc.). Information may be passed on to other components of the device. Receiver 710 may be an example of aspects of transceiver 1035 described with reference to FIG. 10. Receiver 710 may utilize a single antenna or a set of antennas.

Receiver 710 may receive an uplink transmission at a power level based on the power configuration information.

Base station communications manager 715 may be an example of aspects of base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of base station communications manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 715 and/ or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may generate, at a base station 105, power configuration information indicating a set of procedure-specific power uplink power parameters and transmit the power configuration information to a UE 115.

Transmitter 720 may transmit signals generated by other components of the device. In some examples, transmitter 720 may be collocated with receiver 710 in a transceiver module. For example, transmitter 720 may be an example of aspects of transceiver 1035 described with reference to FIG. 10. Transmitter 720 may utilize a single antenna or a set of antennas.

Figure 8:
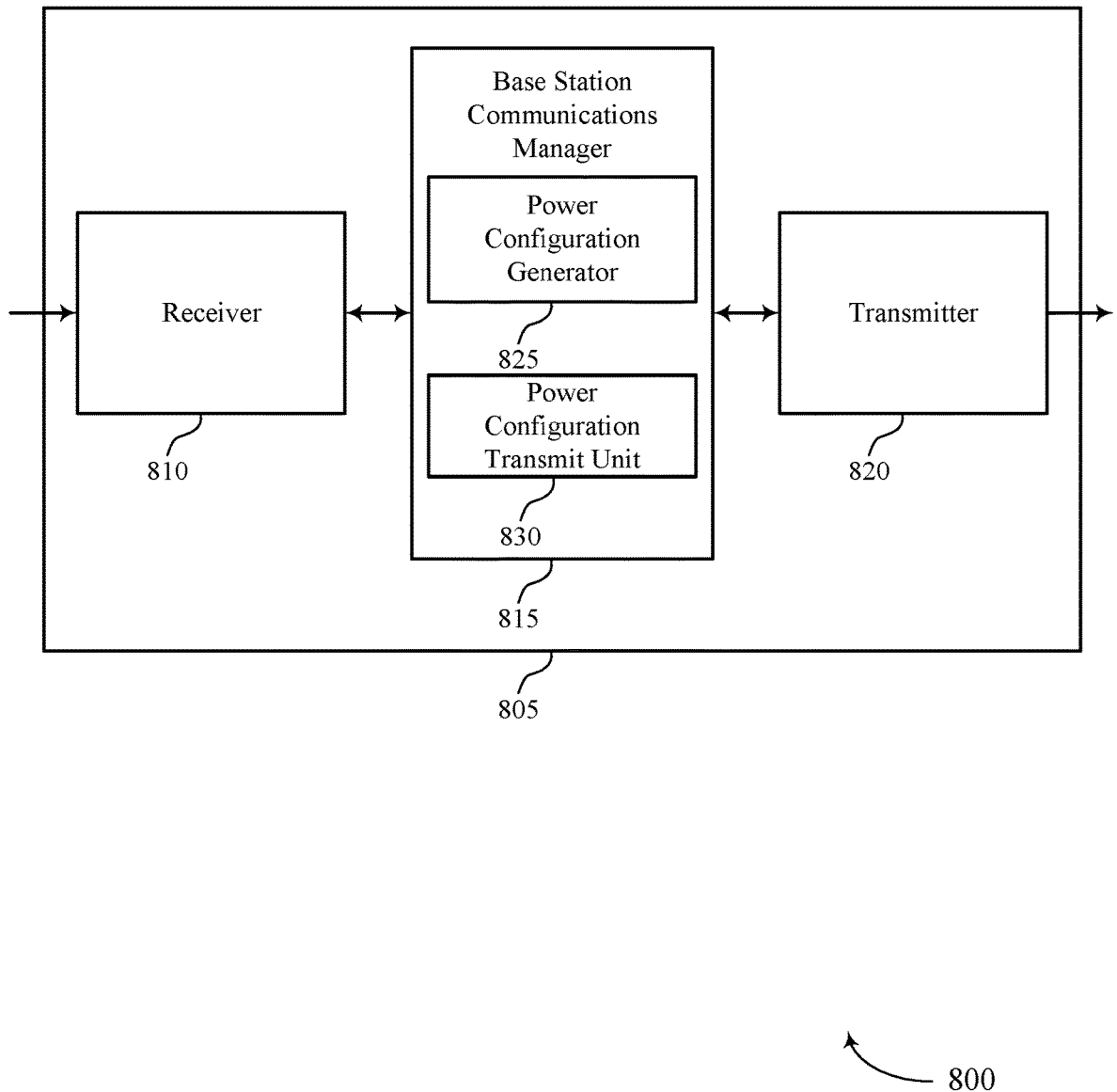

FIG. 8 shows a block diagram 800 of a wireless device 805 that supports procedure-based uplink power control in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to procedure-based uplink power control, etc.). Information may be passed on to other components of the device. Receiver 810 may be an example of aspects of the transceiver 1035 described with reference to FIG. 10. Receiver 810 may utilize a single antenna or a set of antennas.

Base station communications manager 815 may be an example of aspects of base station communications manager 1015 described with reference to FIG. 10.

Base station communications manager 815 may also include power configuration generator 825 and power configuration transmit unit 830.

Power configuration generator 825 may generate, at a base station 105, power configuration information indicating a set of procedure-specific power uplink power parameters. In some cases, generating the power configuration information includes: generating a base power level for the UE 115. In some cases, generating the power configuration includes generating an offset for each uplink procedure associated with one of the procedure-specific uplink power parameters. In some cases, generating the power configuration information includes generating procedure-specific uplink power parameters for each of the one or more uplink procedures. In some cases, at least one of the set of procedure-specific uplink power parameters includes a cell-specific component and a UE-specific component. In some cases, one of the set of procedure-specific uplink power parameters corresponds to at least one of a beam failure recovery procedure, a scheduling request procedure, a channel state information-reference signal (CSI-RS) reporting procedure, an acknowledgement/negative acknowledgement (ACK/NACK) procedure, a handover procedure, an ultra-reliable and low-latency communication (URLLC) procedure, or a combination thereof.

Power configuration transmit unit 830 may transmit the power configuration information to a UE. In some cases, transmitting the power configuration information includes transmitting an RRC signaling including the power configuration information. In some cases, transmitting the power configuration information includes transmitting a master information block including the set of procedure-specific uplink power parameters, a system information block the set of procedure-specific uplink power parameters, or a combination thereof.

Transmitter 820 may transmit signals generated by other components of the device. In some examples, transmitter 820 may be collocated with receiver 810 in a transceiver module. For example, transmitter 820 may be an example of aspects of transceiver 1035 described with reference to FIG. 10. Transmitter 820 may utilize a single antenna or a set of antennas.

Figure 9:
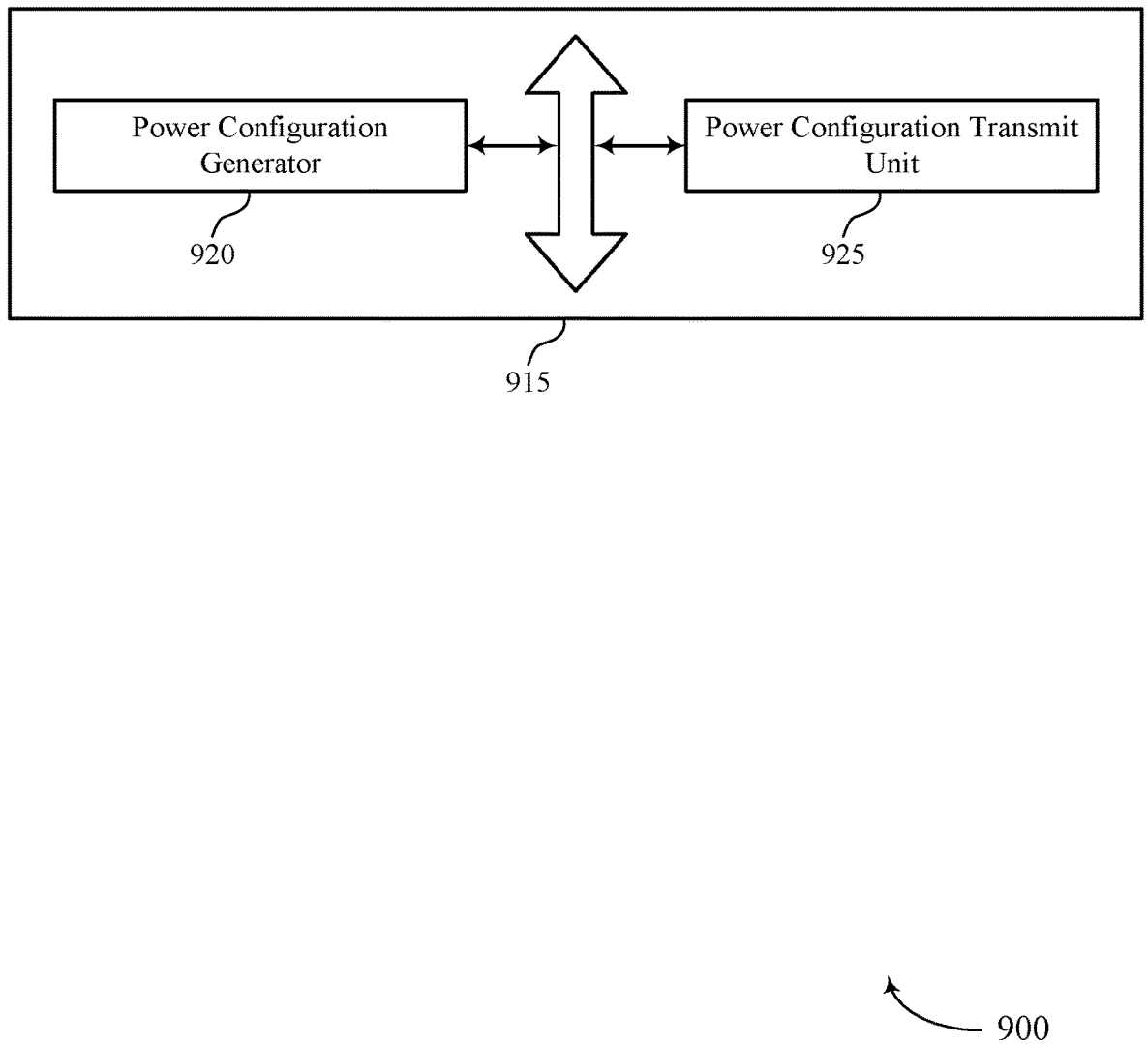

FIG. 9 shows a block diagram 900 of base station communications manager 915 that supports procedure-based uplink power control in accordance with aspects of the present disclosure. Base station communications manager 915 may be an example of aspects of base station communications manager 715, 815, and 1015 described with reference to FIGS. 7, 8, and 10. Base station communications manager 915 may include power configuration generator 920 and power configuration transmit unit 925. Each of these modules may communicate, directly or indirectly, with one another (e.g., via one or more buses).

Power configuration generator 920 may generate, at a base station 105, power configuration information indicating a set of procedure-specific power uplink power parameters. In some cases, generating the power configuration information includes: generating a base power level for the UE 115. In some cases, generating the power configuration includes generating an offset for each uplink procedure associated with one of the procedure-specific uplink power parameters. In some cases, generating the power configuration information includes generating procedure-specific uplink power parameters for each of the one or more uplink procedures. In some cases, at least one of the set of procedure-specific uplink power parameters includes a cell-specific component and a UE-specific component. In some cases, one of the set of procedure-specific uplink power parameters corresponds to at least one of a beam failure recovery procedure, a scheduling request procedure, a channel state information-reference signal (CSI-RS) reporting procedure, an acknowledgement/negative acknowledgement (ACK/NACK) procedure, a handover procedure, an ultra-reliable and low-latency communication (URLLC) procedure, or a combination thereof.

Power configuration transmit unit 925 may transmit the power configuration information to a UE. In some cases, transmitting the power configuration information includes transmitting an RRC signaling including the power configuration information. In some cases, transmitting the power configuration information includes transmitting a master information block including the set of procedure-specific uplink power parameters, a system information block including the set of procedure-specific uplink power parameters, or a combination thereof.

Figure 10:
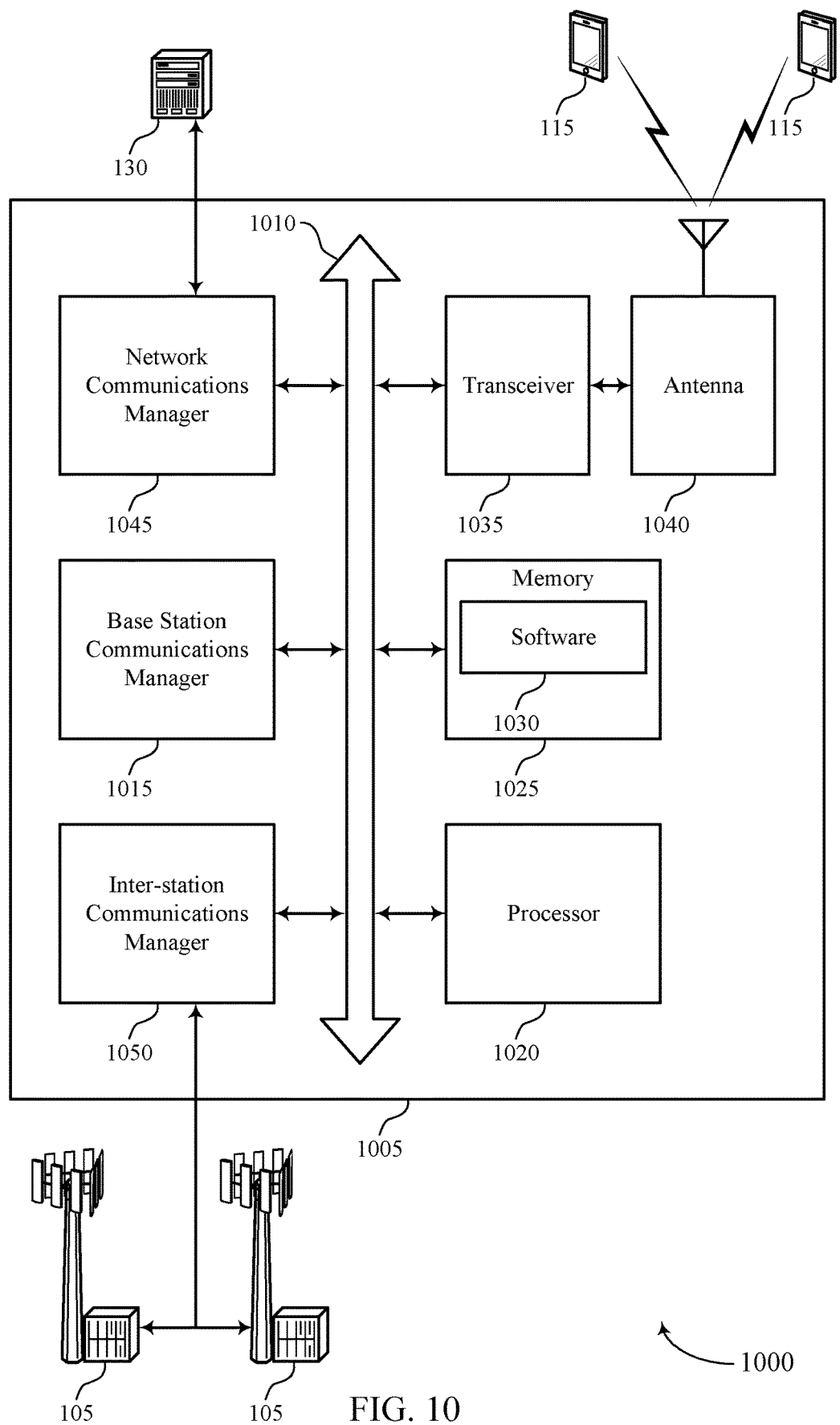
FIG. 10 illustrates a block diagram of a system including a base station that supports procedure-based uplink power control in accordance with aspects of the present disclosure.

FIG. 10 shows a diagram of a system 1000 including a device 1005 that supports procedure-based uplink power control in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting procedure-based uplink power control).

Memory 1025 may include RAM and ROM. Memory 1025 may store computer-readable, computer-executable software 1030 including instructions that, when executed, cause processor 1020 to perform various functions described herein. In some cases, memory 1025 may contain, among other things, a BIOS which may control basic hardware or software operation such as the interaction with peripheral components or devices.

Software 1030 may include code to implement aspects of the present disclosure, including code to support procedure-based uplink power control. Software 1030 may be stored in a non-transitory computer-readable medium such as system memory or other memory. In some cases, software 1030 may not be directly executable by the processor but may cause a computer (e.g., when compiled and executed) to perform functions described herein.

Transceiver 1035 may communicate bi-directionally, via one or more antennas, wired, or wireless links as described above. For example, transceiver 1035 may represent a wireless transceiver and may communicate bi-directionally with another wireless transceiver. Transceiver 1035 may also include a modem to modulate the packets and provide the modulated packets to the antennas for transmission, and to demodulate packets received from the antennas.

In some cases, the wireless device 1005 may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
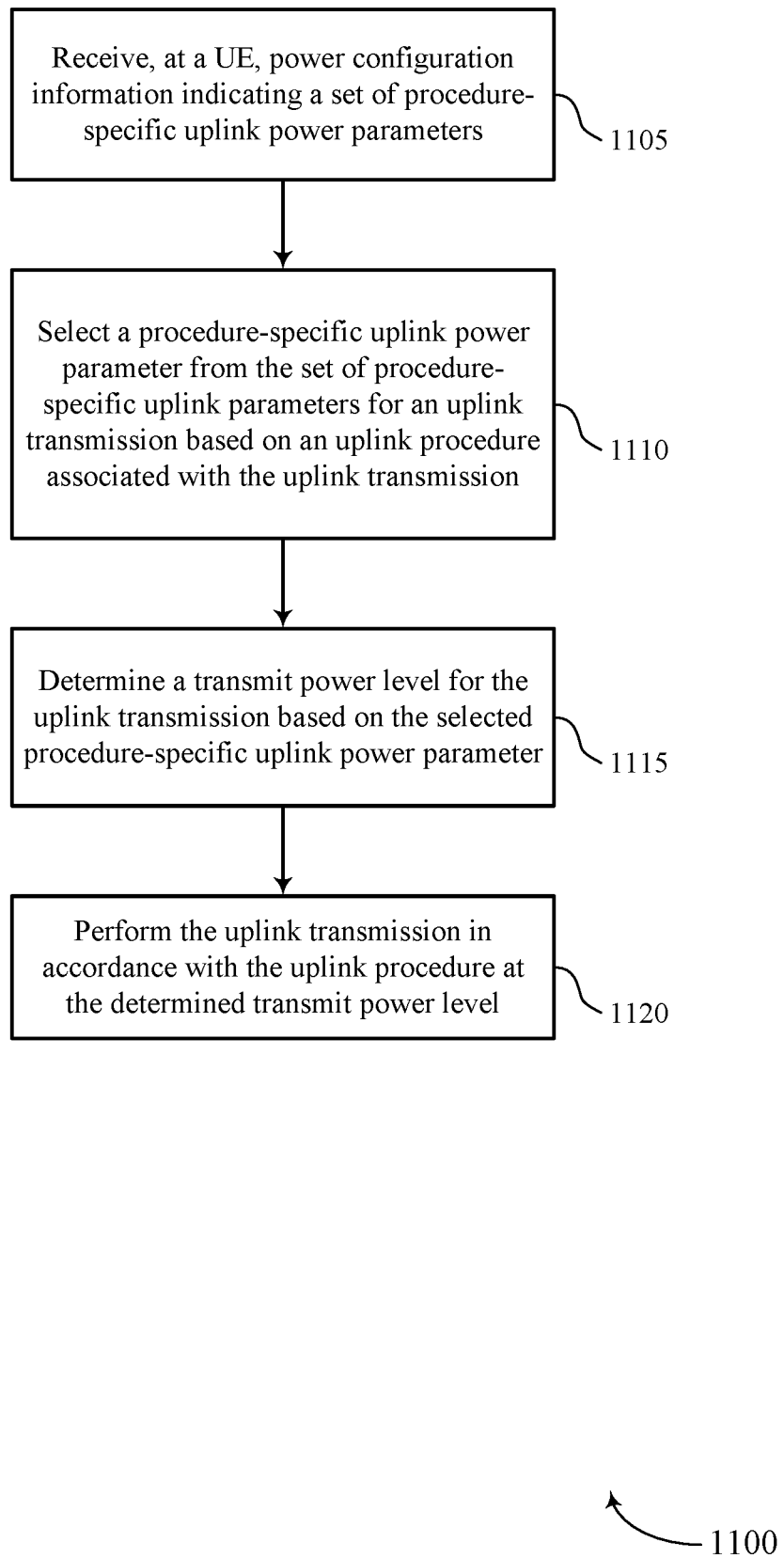
FIGS. 11 through 12 illustrate methods for procedure-based uplink power control in accordance with aspects of the present disclosure.

FIG. 11 shows a flowchart illustrating a method 1100 for procedure-based uplink power control in accordance with aspects of the present disclosure. The operations of method 1100 may be implemented by a UE 115 or its components as described herein. For example, the operations of method 1100 may be performed by UE communications manager 315, 415, 515, and 615 as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1105, the UE 115 may receive power configuration information indicating a plurality of procedure-specific uplink power parameters. The operations of block 1105 may be performed according to the methods described herein. In certain examples, aspects of the operations of block 1105 may be performed by power configuration processor 315, 425, 520, and 615 as described with reference to FIGS. 3 through 6.

At block 1110, the UE 115 may select a procedure-specific uplink power parameter from the plurality of procedure-specific uplink parameters for an uplink transmission based at least in part on an uplink procedure associated with the uplink transmission. The operations of block 1110 may be performed according to the methods described herein. In certain examples, aspects of the operations of block 1110 may be performed by parameter selector 315, 430, 525, and 615 as described with reference to FIGS. 3 through 6.

At block 1115, the UE 115 may determine a transmit power level for the uplink transmission based at least in part on the selected procedure-specific uplink power parameter. The operations of block 1115 may be performed according to the methods described herein. In certain examples, aspects of the operations of block 1115 may be performed by transmit power determination unit 315, 435, 530, and 615 as described with reference to FIGS. 3 through 6.

At block 1120, the UE 115 may perform the uplink transmission in accordance with the uplink procedure at the determined transmit power level. The operations of block 1120 may be performed according to the methods described herein. In certain examples, aspects of the operations of block 1120 may be performed by uplink transmission unit 315, 440, 535, and 615 as described with reference to FIGS. 3 through 6.

Figure 12:
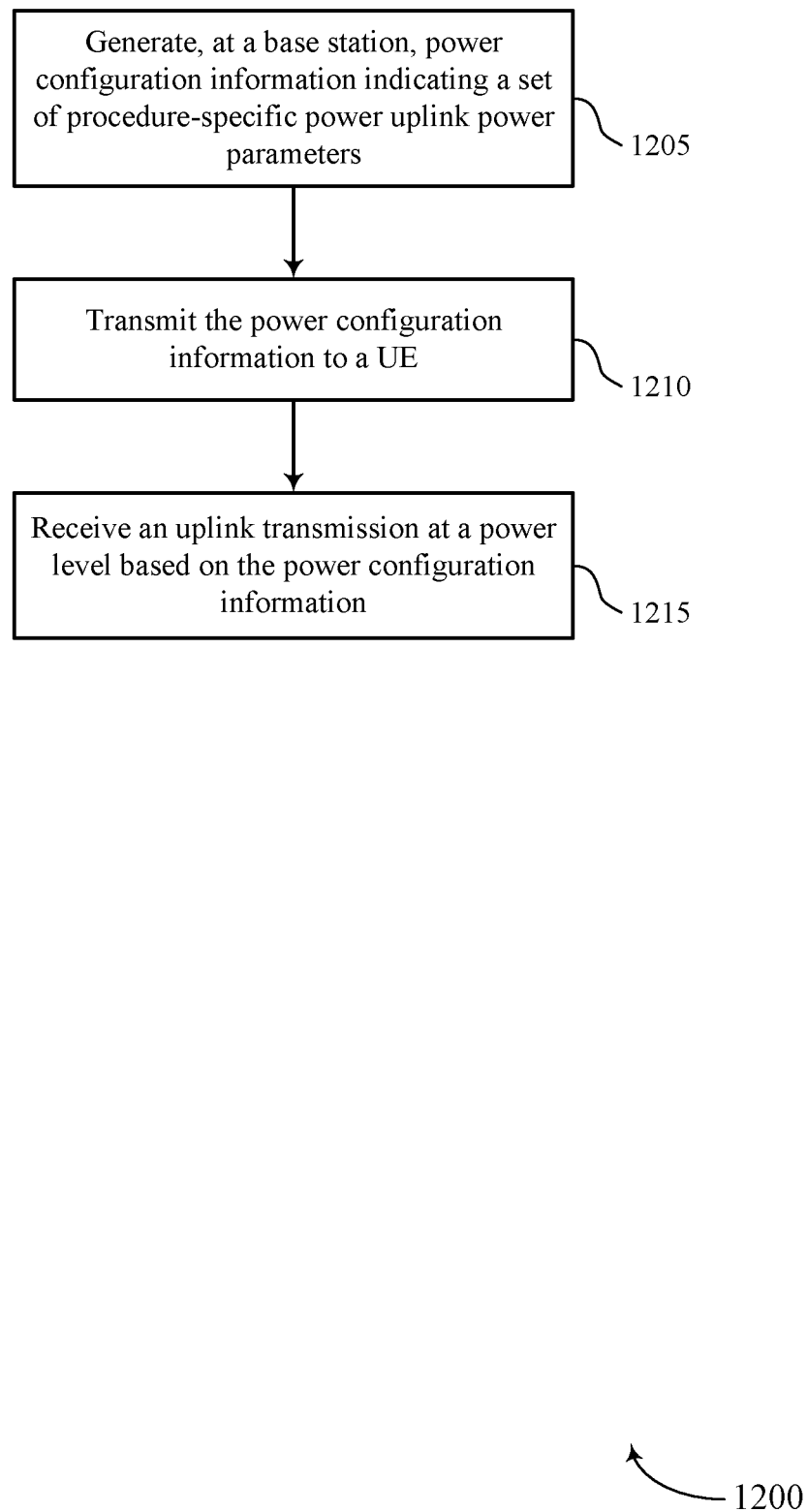

FIG. 12 shows a flowchart illustrating a method 1200 for procedure-based uplink power control in accordance with aspects of the present disclosure. The operations of method 1200 may be implemented by a base station 105 or its components as described herein. For example, the operations of method 1200 may be performed by base station communications manager 715, 815, 915, and 1015 as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1205, the base station 105 may generate, at a base station, power configuration information indicating a plurality of procedure-specific power uplink power parameters. The operations of block 1205 may be performed according to the methods described herein. In certain examples, aspects of the operations of block 1205 may be performed by power configuration generator 715, 825, 920, and 1015 as described with reference to FIGS. 7 through 10.

At block 1210, the base station 105 may transmit the power configuration information to a UE 115. The operations of block 1210 may be performed according to the methods described herein. In certain examples, aspects of the operations of block 1210 may be performed by power configuration transmit unit 715, 830, 925, and 1015 as described with reference to FIGS. 7 through 10.

At block 1215, the base station 105 may receive an uplink transmission at a power level based at least in part on the power configuration information. The operations of block 1215 may be performed according to the methods described herein. In certain examples, aspects of the operations of block 1215 may be performed by receiver 710, 810 and 1035 as described with reference to FIGS. 7, 8 and 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), power configuration information indicating a plurality of procedure-specific values of an uplink power parameter, each procedure-specific value of the plurality of procedure-specific values being associated with a different uplink procedure of a plurality of uplink procedures;
selecting an uplink procedure of the plurality of uplink procedures for an uplink transmission;
selecting a procedure-specific value of the uplink power parameter from the plurality of procedure-specific values of the uplink power parameter that is associated with the uplink transmission based at least in part on the selected uplink procedure, the procedure-specific value for use as part of the selected uplink procedure;
determining a transmit power level for the uplink transmission based at least in part on the selected procedure-specific value of the uplink power parameter; and
transmitting the uplink transmission in accordance with the selected uplink procedure at the determined transmit power level.

2. The method of claim 1, wherein:
receiving the power configuration information comprises receiving a radio resource control (RRC) message comprising the power configuration information.

3. The method of claim 1, wherein:
receiving the power configuration information comprises receiving one or more of a master information block comprising the power configuration information, a system information block comprising the power configuration information, or a combination thereof.

4. The method of claim 1, wherein:
the plurality of procedure-specific values of the uplink power parameter comprises a base power level.

5. The method of claim 1, wherein:
the plurality of procedure-specific values of the uplink power parameter comprises an offset from a base power level for each of the uplink procedures of the plurality of uplink procedures.

6. The method of claim 1, wherein:
the plurality of procedure-specific values of the uplink power parameter comprises procedure-specific power levels for each of the uplink procedures of the plurality of uplink procedures.

7. The method of claim 1, wherein:
the selected procedure-specific value of the uplink power parameter comprises at least one of base station received power per resource block, a closed loop parameter using feedback from a base station, or a combination thereof.

8. The method of claim 1, wherein:
the selected procedure-specific value of the uplink power parameter comprises at least one of an initial target power, a power offset for a preamble format, or a power increase rate if one or more retransmissions are to be made.

9. The method of claim 1, wherein:
the selected procedure-specific value of the uplink power parameter comprises a cell-specific component and a UE-specific component.

10. The method of claim 1, wherein:
the selected uplink procedure comprises at least one of a beam failure recovery procedure, a scheduling request procedure, a channel state information-reference signal (CSI-RS) reporting procedure, an acknowledgement/negative acknowledgement (ACK/NACK) procedure, a handover procedure, a sounding reference signal (SRS) procedure, an ultra-reliable and low-latency communication (URLLC) procedure, or a combination thereof.

11. A method for wireless communication, comprising:
generating, at a base station, power configuration information indicating a plurality of procedure-specific values of an uplink power parameter, each procedure-specific value of the plurality of procedure-specific values of the uplink power parameter being associated with a different uplink procedure of a plurality of uplink procedures, wherein at least one procedure-specific value of the plurality of procedure-specific values is configured for use as part of an uplink procedure associated with an uplink transmission by a user equipment (UE);
transmitting the power configuration information to the UE; and
receiving the uplink transmission at a power level based at least in part on the power configuration information.

12. The method of claim 11, wherein:
transmitting the power configuration information comprises transmitting radio resource control (RRC) signaling comprising the power configuration information.

13. The method of claim 11, wherein:
transmitting the power configuration information comprises transmitting a master information block, a system information block, or a combination thereof comprising the plurality of procedure-specific values of the uplink power parameter.

14. The method of claim 11, wherein:
generating the power configuration information comprises generating a base power level for the UE.

15. The method of claim 11, wherein:
generating the power configuration information comprises generating an offset for each uplink procedure of the plurality of uplink procedures associated with one of the procedure-specific values of the uplink power parameter.

16. The method of claim 11, wherein:
at least one of the plurality of procedure-specific values of the uplink power parameter comprises a cell-specific component and a UE-specific component.

17. The method of claim 11, wherein:
one of the plurality of procedure-specific values of the uplink power parameter corresponds to at least one of a beam failure recovery procedure, a scheduling request procedure, a channel state information-reference signal (CSI-RS) reporting procedure, an ultra-reliable and low-latency communication (URLLC) procedure, or a combination thereof.

18. An apparatus for wireless communication, comprising:
a processor;
memory coupled with the processor; and
instructions stored in the memory and operable, when executed by the processor, to cause the apparatus to:
receive power configuration information indicating a plurality of procedure-specific values of an uplink power parameter, each procedure-specific value of the plurality of procedure-specific values being associated with a different uplink procedure of a plurality of uplink procedures;
select an uplink procedure of the plurality of uplink procedures for an uplink transmission;
select a procedure-specific value of the uplink power parameter from the plurality of procedure-specific values of the uplink power parameter that is associated with the uplink transmission based at least in part on the selected uplink procedure, the procedure-specific value for use as part of the selected uplink procedure;
determine a transmit power level for the uplink transmission based at least in part on the selected procedure-specific value of the uplink power parameter; and
transmitting the uplink transmission in accordance with the selected uplink procedure at the determined transmit power level.

19. The apparatus of claim 18, where in the instructions, when executed by the processor, further cause the apparatus to:
receive a radio resource control (RRC) message comprising the power configuration information.

20. The apparatus of claim 18, wherein the instructions, when executed by the processor, further cause the apparatus to:
receive one or more of a master information block comprising the power configuration information, a system information block comprising the power configuration information, or a combination thereof.

21. The apparatus of claim 18, wherein:
the plurality of procedure-specific values of the uplink power parameter comprises a base power level.

22. The apparatus of the claim 18, wherein:
the plurality of procedure-specific values of the uplink power parameter comprises an offset from a base power level for each of the uplink procedure of the plurality of uplink procedures.

23. The apparatus of claim 18, wherein:
the plurality of procedure-specific values of the uplink power parameter comprises procedure-specific power levels for each of the uplink procedures of the plurality of uplink procedures.

24. The apparatus of claim 18, wherein:
the selected procedure-specific value of the uplink power parameter comprises one or more of a base station received power per resource block, a closed loop parameter using feedback from a base station, or a combination thereof.

25. The apparatus of claim 18, wherein:
the selected procedure-specific value of the uplink power parameter comprises at least one of an initial target power, a power offset for a preamble format, or a power increase rate if one or more retransmissions are to be made.

26. An apparatus for wireless communication, comprising:
a processor;
memory coupled with the processor; and
instructions stored in the memory and operable, when executed by the processor, to cause the apparatus to:
generate power configuration information indicating a plurality of procedure-specific values of an uplink power parameter, each procedure-specific value of the plurality of procedure-specific values being associated with a different uplink procedure of a plurality of uplink procedures, wherein at least one procedure-specific value of the plurality of procedure-specific values is configured for use as part of an uplink procedure associated with an uplink transmission by a user equipment (UE);
transmit the power configuration information to the UE; and
receive the uplink transmission at a power level based at least in part on the power configuration information.

27. The apparatus of claim 26, wherein the instructions, when executed by the processor, further cause the apparatus to:
transmit radio resource control (RRC) signaling comprising the power configuration information.

28. The apparatus of claim 26, wherein the instructions, when executed by the processor, further cause the apparatus to:
transmit a master information block comprising the power configuration information, a system information block comprising the power configuration information, or a combination thereof.

29. The apparatus of claim 26, wherein the instructions, when executed by the processor, further cause the apparatus to:
generate a base power level for the UE.

30. The apparatus of claim 18, wherein:
the selected uplink procedure comprises at least one of a beam failure recovery procedure, a scheduling request procedure, a channel state information-reference signal (CSI-RS) reporting procedure, an acknowledgement/negative acknowledgement (ACK/NACK) procedure, a handover procedure, a sounding reference signal (SRS) procedure, an ultra-reliable and low-latency communication (URLLC) procedure, or a combination thereof.

* * * * *